(12) United States Patent
Zhai

(10) Patent No.: US 7,664,044 B2
(45) Date of Patent: Feb. 16, 2010

(54) METHOD OF FAILURE DETECTION IN AN IP FORWARDING PLANE

(75) Inventor: Suping Zhai, Guangdong (CN)

(73) Assignee: Huawei Technologies Co., Ltd., Shenzhen Guangdong (CN)

(*) Notice: Subject to any disclaimer, the term of this patent is extended or adjusted under 35 U.S.C. 154(b) by 457 days.

(21) Appl. No.: 11/526,567

(22) Filed: Sep. 26, 2006

(65) Prior Publication Data

US 2007/0189177 A1 Aug. 16, 2007

Related U.S. Application Data

(63) Continuation of application No. PCT/CN2006/001563, filed on Jul. 4, 2006.

(30) Foreign Application Priority Data

| Aug. 5, 2005 | (CN) | ............... 2005 1 0087705 |
| Aug. 5, 2005 | (CN) | ............... 2005 1 0087706 |

(51) Int. Cl.
*H04J 1/16* (2006.01)
(52) U.S. Cl. .................. 370/242; 370/241; 370/244; 370/249; 370/250; 370/271
(58) Field of Classification Search .............. 370/216, 370/217, 242, 248, 244, 245, 241, 249, 250, 370/271

See application file for complete search history.

(56) References Cited

U.S. PATENT DOCUMENTS

| 6,553,423 | B1 * | 4/2003 | Chen | 709/230 |
| 7,327,683 | B2 * | 2/2008 | Ogier et al. | 370/236 |
| 7,406,030 | B1 * | 7/2008 | Rijsman | 370/216 |
| 7,499,395 | B2 * | 3/2009 | Rahman et al. | 370/229 |
| 7,561,527 | B1 * | 7/2009 | Katz et al. | 370/241 |
| 2005/0135261 | A1 * | 6/2005 | Lee et al. | 370/241 |
| 2006/0029076 | A1 * | 2/2006 | Namihira et al. | 370/392 |
| 2006/0198322 | A1 * | 9/2006 | Hares | 370/254 |

OTHER PUBLICATIONS

Zhai; ( "BFD initialization with BGP and static routes"); Jun. 2005; BFD Working Group; pp. 1-7.*
Katz et al. ("Bidirectional Forwarding Detection"); Jul. 2005; Newtork working Group; pp. 1-44.*
Katz et al. ("BFD: Bidirectional Forwarding Detection Forwarding Plane Failover Detection") Jun. 2003; pp. 1-20.*
Katz Juniper Networks D Ward Cisco Systems D: "Bidirectional Forwarding Detection; draft-ietf-bfd-base-03.txt" IETF Standard-Working-Draft, Internet Engineering Task Force, IETF, CH, vol. bfd, No. 3, Jul. 1, 2005, XP015041399; ISSN: 0000-0004; Chapters 2 and 3.

(Continued)

*Primary Examiner*—Ricky Ngo
*Assistant Examiner*—Dewanda Samuel
(74) *Attorney, Agent, or Firm*—Darby & Darby P.C.

(57) ABSTRACT

A method of failure detection on an Internet Protocol (IP) forwarding plane, which includes: IP nodes of the two ends obtain Bidirectional Forwarding Detection (BFD) identifier information which is used in the BFD, moreover start a BFD session, encapsulate and transport a BFD packet between the IP nodes running the BFD session and implement the failure detection according to the BFD packet transported between the IP nodes. The method of this invention realizes the failure detection via starting the BFD session and via transporting the BFD packet between the inter-domain IP nodes or the intra-domain IP nodes.

4 Claims, 3 Drawing Sheets

OTHER PUBLICATIONS

Suping Zhai Huawei Technologies Co et al.: "BFD applications with BGP and static routes; draft-suping-bfd-bgp-static-app-00.txt" IETF Standard-Working-Draft, Internet Engineering Task Force, IETF, CH, Jun. 1, 2005, XP015040064 ISSN: 0000-0004, Chapters 1 to o3.

* cited by examiner

METHOD OF FAILURE DETECTION IN AN IP FORWARDING PLANE

CROSS-REFERENCE TO RELATED APPLICATIONS

This is a continuation of International Application No. PCT/CN2006/001563, filed on Jul. 4, 2006; which claims priority of Chinese Patent Application No. 200510087706.7, filed Aug. 5, 2005 and Chinese Patent Application No. 200510087705.2, filed Aug. 5, 2005, the disclosure of each application is hereby incorporated by reference in their entirety.

FIELD OF THE TECHNOLOGY

The present invention relates to Bidirectional Forwarding Detection (BFD) techniques, and more particularly, to a method for realizing failure detection in an Internet Protocol (IP) forwarding plane by adopting the BFD.

BACKGROUND OF THE INVENTION

Along with the development of communication techniques, how to reliably transmit a data service and how to locate the failure quickly when there is a failure during transmitting the data have become important problems that need to be resolved urgently. Therefore, the BFD has emerged as the time requires as a fast detection mechanism. The BFD detects the links via a fast Hello mechanism with a negotiated speed rate.

The BFD can be used for detecting the correctness of various transmissions, such as an Ethernet, a Multiple Protocol Label Switching (MPLS) path, a common route encapsulation and an Internet Protocol Security (IPSec) tunnel.

The BFD fundamentally develops from basic transport techniques, therefore the BFD can detect the failure on any layer of the network. The objective of the BFD is to provide a failure detection mechanism with a low cost and a short detecting period on the path between adjacent routers. The adjacent routers are the routers that connect with each other via one or several logic links, but not limited to one hop between the routers. The BFD can perform a failure detection of an interface, a data link and an extended forwarding engine itself.

The BFD, as a method of failure detection in a lightweight link or a node or an interface, has great advantages in the failure detection on a data plane. At present, the BFD defines a status machine for implementing the failure detection and some necessary parameters for setting up and maintaining a BFD session, and expresses the status machine and the parameters with a data load, such that diversified protocols and media can use the status machine and the parameters mentioned above as the data load while adopting the BFD as a failure detection mechanism on the data plane. However, the BFD itself does not define a method about how to start the BFD session in any media and protocols. Thereby, if adopting the BFD to implement the failure detection on a data plane, there is no detailed implementation scheme at present.

At present, a method about how to adopt the BFD as a Label Switching Path (LSP) failure detection in the MPLS network and an encapsulating method for a BFD load in the MPLS are defined. Meanwhile for the BFD session startup, a method of failure detection on the MPLS LSP data plane is adopted. The corresponding intra-domain LSP detected is as shown in FIG. 1. The intra-domain LSP can be a path between Label Switching Router (LSR) A and LSR B in Domain A. The corresponding inter-domain LSP detected is as shown in FIG. 2. The inter-domain LSP can be a path between LSR A and LSR B located in Domain A and Domain B respectively. In addition, an encapsulation is defined, in which the BFD load is taken as a User Datagram Protocol (UDP) load.

However, the foregoing technique scheme with regard to a method for the MPLS LSP adopting the BFD to implement the failure detection does not take into account the method for adopting the BFD to implement the failure detection on the IP forwarding plane.

SUMMARY OF THE INVENTION

The present invention discloses a method for implementing a failure detection on an Internet Protocol (IP) forwarding plane, which uses Bidirectional Forwarding Detection (BFD) to implement the failure detection on the IP forwarding plane.

The method includes:

IP nodes obtain Bidirectional Forwarding Detection (BFD) identifier information which is used in the BFD, and start a BFD session;

the IP nodes encapsulate a BFD packet and transport the packet between the IP nodes running the BFD session;

a failure is detected according to the BFD packet transported between the IP nodes.

As shown in the foregoing technical scheme, this invention realizes the BFD failure detection via utilizing IP nodes to obtain the BFD identifier information which is used for the BFD, and starts the BFD session with the obtained BFD identifier. When both IP nodes, as the BFD Session ends, are inter-domain IP nodes and the route between the IP nodes is populated dynamically, the foregoing method for obtaining the BFD identifier may include transporting the BFD identifier information between the inter-domain IP nodes via an OPEN packet of the BGP, or configuring the corresponding BFD identifier information in advance in the inter-domain IP nodes respectively. When both IP nodes, as the BFD Session ends, are inter-domain or intra-domain IP nodes, and the route between the IP nodes is configured statically, the foregoing method for obtaining the BFD identifier includes: configuring the corresponding BFD identifier information in each IP node respectively, or transporting the BFD identifier information between the IP nodes via the ICMPv4 packet.

The method of this invention starts the BFD session, and realizes the failure detection via transporting the BFD packet between the IP nodes which are inter-domain or intra-domain.

EMBODIMENTS OF THE INVENTION

To make the objective, technical scheme and advantages of the present invention clearer, the present invention is hereinafter further described in detail with reference to the accompanying drawings and preferred embodiments.

According to the embodiments of the present invention, the IP nodes obtain BFD identifier information used in the BFD and start the BFD session, encapsulate and transport the BFD packet between the IP nodes of the BFD session; detect the failure according to the BFD packet transported between the IP nodes.

Figure 1:
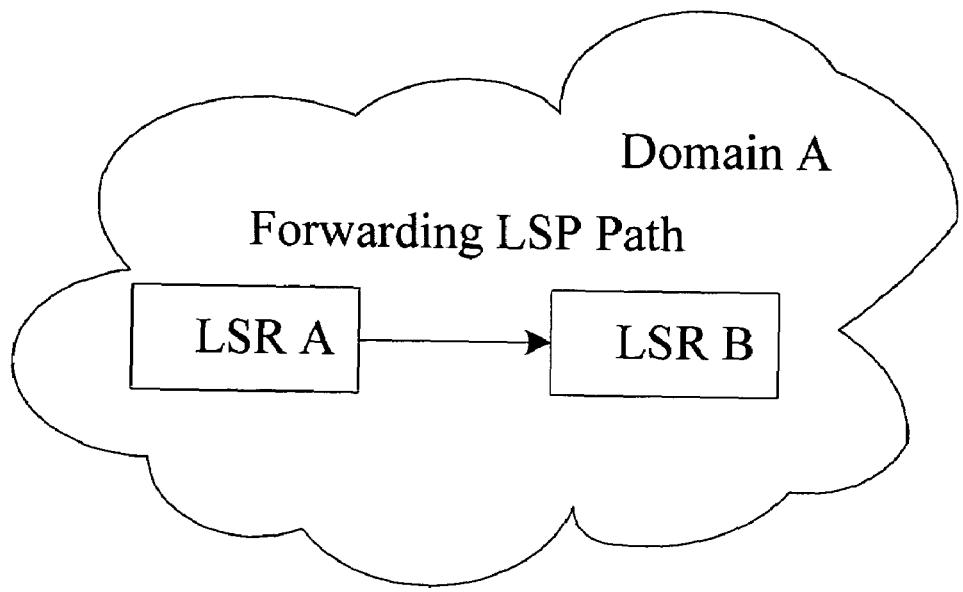
FIG. 1 is a schematic diagram illustrating an LSP in a detected domain.
Figure 2:
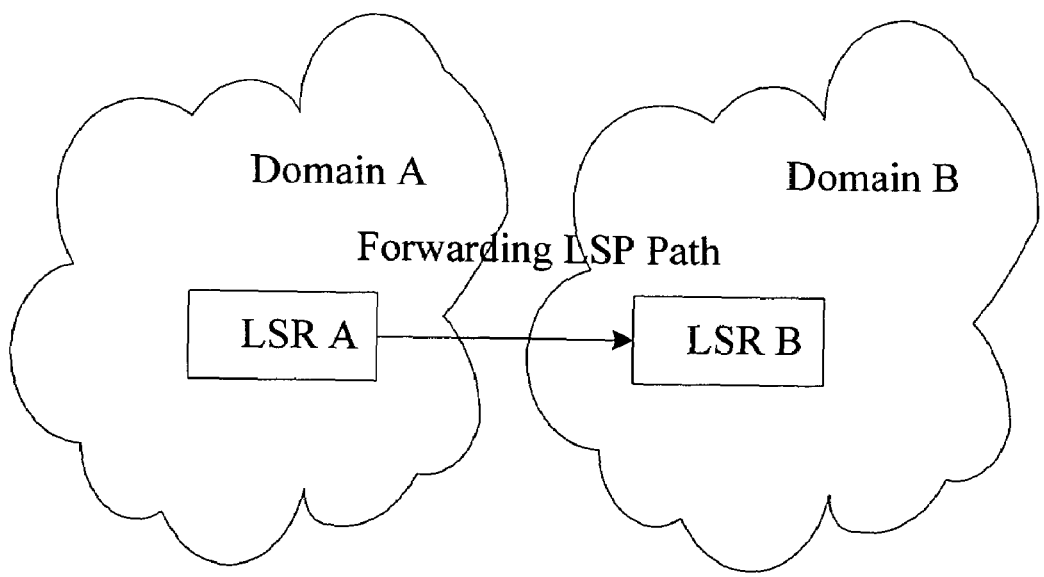
FIG. 2 is a schematic diagram illustrating an LSP inter-domain.
Figure 3:
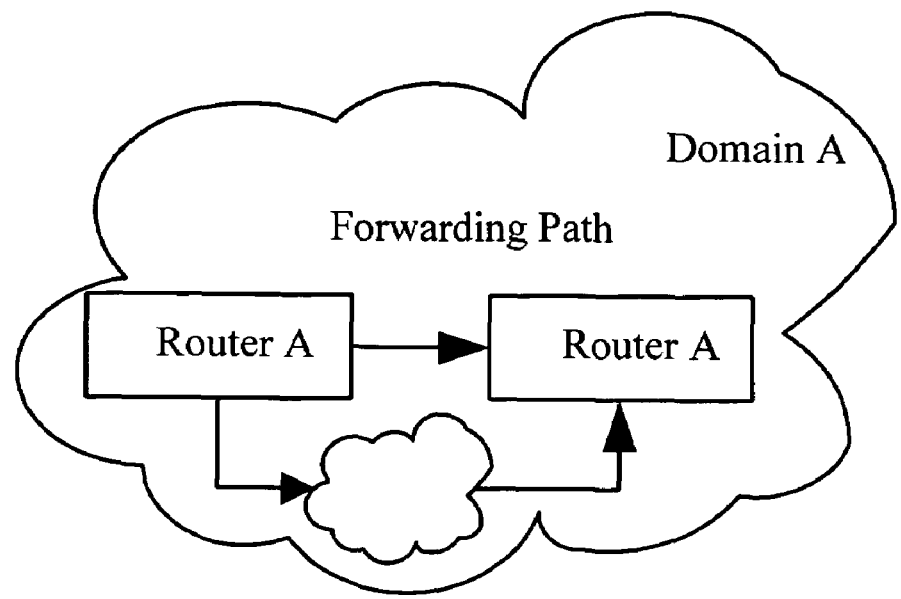
FIG. 3 is a schematic diagram illustrating the structure of the IP nodes in a domain to implement a BFD session.
Figure 4:
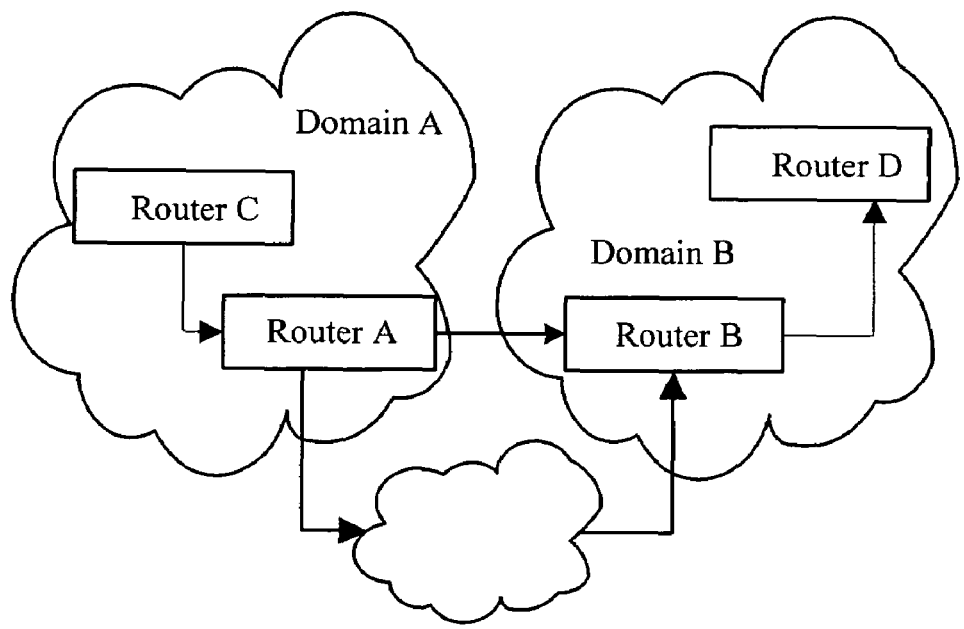
FIG. 4 is a schematic diagram illustrating the structure of the inter-domain IP nodes to implement the BFD session

The IP forwarding plane consists of intra-domain IP forwarding plane and inter-domain IP forwarding plane, as shown in FIG. 3 and FIG. 4 respectively. FIG. 3 is a schematic diagram illustrating the structure of the intra-domain IP nodes implementing the BFD session, and FIG. 4 is a schematic diagram illustrating the structure of the inter-domain IP nodes implementing the BFD session. The configuration of the route between the IP nodes can be a dynamic configuration or a static configuration. The concept of the IP forwarding plane is well known to those skilled in the art, thus FIG. 3 and FIG. 4 will not be described in detail herein.

The method for implementing a failure detection is described in detail via two cases: in one case, the nodes of the BFD session are both inter-domain IP nodes and the route between the IP nodes is populated dynamically; in the other case, the nodes of the BFD session are both inter-domain IP nodes or intra-domain IP nodes and the route between the IP nodes is configured statically.

Figure 5:
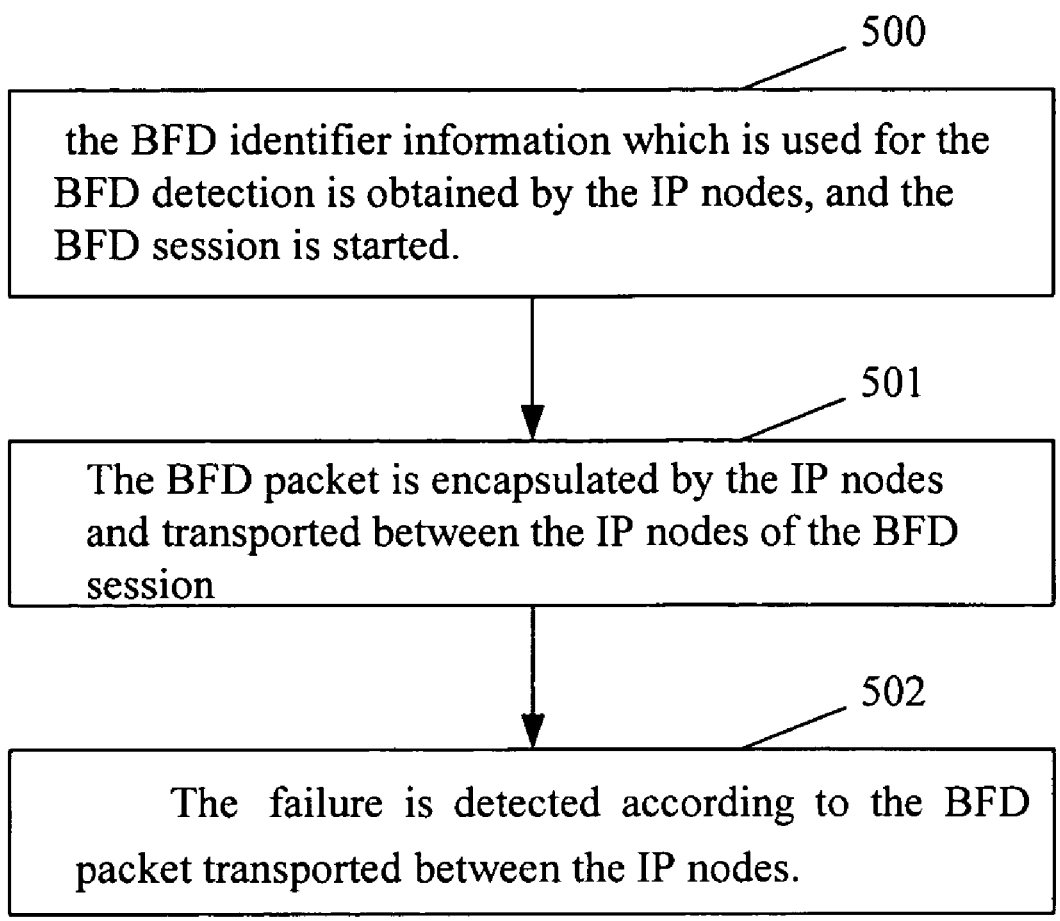
FIG. 5 is a flowchart of the method in accordance with an embodiment of the present invention.

FIG. 5 is a flowchart of a method in accordance with an embodiment of the present invention, including the steps of:

Step 500. IP nodes obtain the BFD identifier information which is used for the BFD and start the BFD session.

1. when the IP nodes are two inter-domain IP nodes and the route between the IP nodes is populated dynamically, the method for obtaining the BFD identifier information which is used for BFD and starting the BFD session can be implemented in two ways.

(1) Extending capabilities option of option parameters in an OPEN packet of Border Gateway Protocol (BGP) and adding a new Capability Code, to carry the BFD session identifier, which is used as capability indicating information to indicate whether the BFD possesses a BFD processing capability. The format of the OPEN packet is as follows:

Capability Code (1 octet): exact code value;
Capability Length (1 octet): Capability Field Length is 4;
Capability Value (variable): used for carrying a capability value, which is a variable and is the actual BFD session identifier information, that is, the BFD identifier information. This Capability Value field can also be called as my discriminator field;

when starting the BFD session, the peer BFD identifier of the session can be obtained in the peer inter-domain IP nodes, according to the BFD capability indicating packet, thus detection correctness can be improved and errors in detection can be avoided. For example, when Router A and Router B are BGP neighbors, if there is a failure in UDP packet forwarding in a forwarding path between Router A and Router B but no failure in Transmission Control Protocol (TCP) packet forwarding, then there is a failure in BFD packet forwarding path, and there is no failure in BGP packet forwarding path. If the BFD does not adopt the BGP OPEN packet to determine whether it possesses a BFD processing ability but starts via another method, such as a static configuration, the start-up via another method mentioned above will lead to the failure of the BFD session between Router A and Router B, since at this moment, the BGP information forwarding runs well, for BGP protocol, it can not differentiate the condition that the BFD session fails from the condition that peer BGP router does not support the BFD, thus it can cause the BGP to consider the forwarding path as normal, and keep on running well though there is a failure on the data plane.

In this Step, if the BGP OPEN packet is adopted to carry the information indicating whether the BGP routers capable of the BFD, the two BGP routers need to start both the BFD session and the BGP session. In order to prevent startup oscillation, the method in accordance with the embodiment of the present invention further provides the following processing for the sequence of starting the BFD session and the BGP session.

In the process of starting the BGP session, when the BFD session is started via the BGP OPEN packet, if the BGP session starts without regarding whether the BFD session has started or not, the BFD session can be started after the BGP session is started. However, if the BFD is in an up state, it is possible to cause the BGP session to restart shortly after setting the BGP session in some conditions. For instance, when Router A and Router B are BGP neighbors, if there is no failure for the TCP packet forwarding in the forwarding path between Router A and Router B, i.e., the forwarding path for the BGP packet is normal but there is a failure in the path for the packets of other protocols, such as the UDP packet, at this moment, some methods can be used to detect the failure in the forwarding path on the data plane, but it can cause the system to restart. However, if the BGP session starts after starting the BFD session, restart will not happen. Because, when the BFD session can not be activated under the foregoing circumstance, the BGP session will always be in an un-established state, i.e., an OPEN state.

Therefore, if the BFD session is started via the BGP OPEN packet when the BGP session is starting, then the BGP session should be started again to make it turn into the established state after the BFD session is in the UP state, the foregoing problem can be avoided. In the process of the BGP session waiting for the BFD session to be started, it is necessary to carry out the corresponding processing for Hold time of the BGP session. For instance, it is possible not to refresh the Hold time, thus the BGP session will not be overtime, and the failure of the BGP session caused by overtime can be avoided. According to the regulation of the protocols, the Hold time means the waiting time needed for the BGP session moving from the OPEN state to the established state.

In the practical application, it can depend on actual conditions to determine whether to start the BGP session before or after the BFD session, or to start the BGP session and the BFD session independently.

Further more, for two IP ends of the BGP, an embodiment of the present invention provides the following method for processing the relationship between the BFD session and a BGP graceful restart in the related art:

If C bit, i.e., a Control Plane Independent bit, resets in the BFD packet of the BFD session, i.e., which declares that a Control Layer down does not affect the BFD session, that is, the BFD session and the control Layer are uncorrelated, thus, when the BFD session happens to detect a failure and the BGP graceful restart is running, it is supposed to pause process of the BGP graceful restart, as there is also a failure on this data layer, the system must be restarted;

If C bit which is set in the BFD packet, i.e., declares that the BFD session and control layer are correlate, the BGP graceful restart process will not be affected, since at this moment, the BFD session and the control layer are correlate. Therefore, no matter whether there is a failure on the forwarding plane or not, the BFD session is failing at this moment.

Suppose 0 of C bit denotes 'uncorrelated' and 1 of C bit denotes 'correlate', after the peer IP nodes of the BFD session receive the BFD packet, if C bit is 0 and the BFD session detects a failure, the BGP graceful restart process stops; if C bit is 1 and the BFD session detects a failure, the BGP graceful restart process continues.

(2) the BFD identifier is obtained via the static configuration in an embodiment of the present invention, which means that: the corresponding BFD identifier information is configured in the inter-domain IP nodes, and an active/passive BFD packet transport mode is also configured, i.e., whether the BFD packet is transported actively or not, actually, both ends can be configured as active modes or one end as active mode, and the other as passive mode; furthermore, the BFD function enabling information on IP nodes can be configured to start the BFD process.

What this Step emphasizes is the method for obtaining the BFD identifier information. Thus, starting the BFD process can refer to related draft regulations and thus it will not be described herein.

2. When the IP nodes are two inter-domain nodes or two intra-domain nodes, and the route between the IP nodes is configured statically, the method for obtaining the BFD identifier information which is used for the BFD and starting the BFD session can be implemented in the following two ways:

(1) The BFD identifier is configured statically.

in the IP nodes of the two ends of links in which the BFD runs, the BFD identifier information is configured statically, and the active/passive BFD packet transport mode of this end is also configured, i.e., whether the BFD packet is transported actively or not, actually, both ends can be configured as the active modes, or one end as the active mode, the other as the passive mode; and, the BFD function enabling information is configured, the BFD process is started by the inter-domain IP nodes or intra-domain IP nodes adopting the BFD identifier.

(2) ICMPv4 Information Request/ICMPv4 Information Reply Message packets are extended to transport the BFD identifier between the IP nodes, so that the BFD identifier can be obtained by the peer and the BFD session can be started.

My discriminator domain is added into ICMPv4 Information Request/ICMPv4 Information Reply Message, which is used for carrying the BFD identifier information of local node. Moreover the ICMPv4 Information Request packet is sent via the source terminal (or terminal) of the forwarding path between the IP nodes, and the BFD identifier of the source terminal (or terminal) is sent to the terminal (or source terminal); meanwhile, the ICMPv4 Information Reply Message which carries the BFD identifier of the terminal (or source terminal) is returned from the terminal (or source terminal), and the packet is sent to the source terminal (or terminal). Via transporting the ICMPv4 packet between the IP nodes, the BFD identifier information of the peer nodes can be obtained by the IP nodes of the two ends of the static route links.

Step 501. The BFD packet is encapsulated by the IP nodes and transported between the IP nodes of the BFD session.

The BFD packet can be encapsulated by the UDP packet, that is, the BFD packet and the BFD load are transported between the IP nodes of the two ends of the links via the UDP packet bearer, the corresponding UDP source port and destination port can be distributed uniformly by Internet Assigned Numbers Authority (IANA) organization. The encapsulating method can refer to related draft regulation.

In the practical application, an application program can determine whether to start and run the BFD function or not according to requirements, so as to detect the failure on a static route forwarding plane.

Step 502. The failure is detected according to the BFD packet transported between the IP nodes.

The detailed BFD process has been described in BFD protocols.

To sum up the foregoing, in the embodiments of the present invention, between the forwarding paths of the BGP neighbors, the BFD is adopted to implement the failure detection on the forwarding plane, and errors in detection which can appear inter-domain when the BFD is used to implement the failure detection of the forwarding paths can be avoided. Meanwhile, for the static route, the BFD is adopted to implement the failure detection on the IP forwarding plane, thereby, the reliability of failure detection of static route forwarding plane increases.

The foregoing are only preferred embodiments of the present invention, are not used for limiting the protection scope of this invention. Any modification, equivalent replacement and improvement based on the principle and spirit of this invention should be covered under the protection scope of this invention.

The invention claimed is:

1. A method for implementing a failure detection on an Internet Protocol (IP) forwarding plane, comprising:
   IP nodes obtaining Bidirectional Forwarding Detection (BFD) identifier information which is used in the BFD via an exchanged Border Gateway Protocol (BGP) packet between the IP nodes, and starting a BFD session between the IP nodes, wherein the IP nodes are two inter-domain IP nodes and the route is populated dynamically,
   the IP nodes encapsulating a BFD packet and transporting the BFD packet between the IP nodes running the BFD session;
   detecting a failure according to the BFD packet transported between the IP nodes;
   a peer IP node of the BFD session determining whether to stop a control layer BGP graceful restart process or not according to a C bit information of the BFD packet, and if the C bit is reset and the BFD session detects the failure, stopping the BGP graceful restart process; otherwise, if the C bit is configured and the BFD session detects the failure, continuing progress of the BGP graceful restarts.

2. The method according to claim 1, wherein the BGP packet is a BGP OPEN packet, the BFD identifier information is carried in a new Capability Code of the BGP OPEN packet; the new Capability Code is added in a Capability option of the BGP OPEN packet.

3. The method according to claim 1, wherein the IP nodes obtain the BFD identifier information and start the BFD session comprises:
   starting the BGP session after the BFD session startup.

4. The method according to claim 1, wherein, the IP nodes encapsulate the BFD packet by is:
   encapsulating the packet by a User Datagram Protocol (UDP) packet.

* * * * *

UNITED STATES PATENT AND TRADEMARK OFFICE
CERTIFICATE OF CORRECTION

PATENT NO. : 7,664,044 B2 Page 1 of 1
APPLICATION NO. : 11/526567
DATED : February 16, 2010
INVENTOR(S) : Suping Zhai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 600 days.

Signed and Sealed this

Thirtieth Day of November, 2010

David J. Kappos
*Director of the United States Patent and Trademark Office*